(12) United States Patent
Kato (10) Patent No.: US 8,122,834 B2
(45) Date of Patent: Feb. 28, 2012

(54) SUSPENSION TYPE ROBOT WHOSE ROBOT BODY RUNS ALONG TRAVELING RAIL

(75) Inventor: Hisaki Kato, Kariya (JP)

(73) Assignee: Denso Wave Incorporated, Tokyo (JP)

( * ) Notice: Subject to any disclaimer, the term of this patent is extended or adjusted under 35 U.S.C. 154(b) by 427 days.

(21) Appl. No.: 12/382,930

(22) Filed: Mar. 26, 2009

(65) Prior Publication Data

US 2009/0245992 A1    Oct. 1, 2009

(30) Foreign Application Priority Data

Mar. 26, 2008  (JP) ................................. 2008-080775

(51) Int. Cl.
  *B61B 3/00* (2006.01)
(52) U.S. Cl. .......................................... 104/93; 104/89
(58) Field of Classification Search .............. 104/89, 104/93, 111, 124, 125, 126; 74/144.41; 414/1, 414/728, 744.1; 901/15, 16
See application file for complete search history.

(56) References Cited

U.S. PATENT DOCUMENTS

| | | | | |
|---|---|---|---|---|
| 3,667,114 A | * | 6/1972 | Smith et al. ........................ 483/5 |
| 3,884,363 A | * | 5/1975 | Ajlouny ........................ 414/626 |
| 4,229,641 A | * | 10/1980 | Ihara ........................... 219/125.1 |
| 4,600,358 A | * | 7/1986 | Graf ............................. 414/751.1 |
| 4,836,111 A | * | 6/1989 | Kaufmann ........................ 104/89 |
| 6,264,590 B1 | * | 7/2001 | Ferrari ............................. 483/13 |
| 6,604,624 B2 | * | 8/2003 | Hirata et al. .................. 198/494 |
| 6,738,691 B1 | * | 5/2004 | Colgate et al. ................. 700/245 |
| 6,860,380 B2 | * | 3/2005 | Watanabe et al. ......... 198/750.11 |
| 7,128,506 B2 | * | 10/2006 | Ferrari et al. .................. 409/201 |
| 7,503,263 B2 | * | 3/2009 | Birkigt et al. .................. 104/111 |
| 2004/0238473 A1 | * | 12/2004 | McKay .......................... 212/315 |
| 2006/0260502 A1 | * | 11/2006 | Hjort ............................... 104/93 |
| 2008/0041806 A1 | * | 2/2008 | Birkigt et al. .................. 212/315 |
| 2008/0230503 A1 | * | 9/2008 | Birkigt et al. .................... 212/71 |
| 2009/0121089 A1 | * | 5/2009 | Tokumitsu ...................... 248/49 |
| 2009/0126524 A1 | * | 5/2009 | Takeda ........................ 74/490.01 |
| 2009/0126598 A1 | * | 5/2009 | Takeda .......................... 105/148 |
| 2009/0245992 A1 | * | 10/2009 | Kato .......................... 414/749.6 |
| 2010/0092273 A1 | * | 4/2010 | Oda et al. ...................... 414/728 |
| 2010/0215470 A1 | * | 8/2010 | Bao et al. .................... 414/749.6 |

FOREIGN PATENT DOCUMENTS

JP    A-63-068382    3/1988

* cited by examiner

*Primary Examiner* — S. Joseph Morano
*Assistant Examiner* — Jason C Smith
(74) *Attorney, Agent, or Firm* — Oliff & Berridge, PLC

(57) ABSTRACT

A suspension type robot comprises posts, support arms having apical ends, a traveling rail mounted between the apical ends of the support arms and robot body. Each of the support arms has at the apical end a U-shape-cut portion providing a U-shape opening and a U-shape upper surface surrounding the U-shape opening. The traveling rail has an attachment portion comprising a first cylinder portion and a second cylinder portion. The first cylinder portion is inserted into the U-shape-cut portion. The second cylinder portion is disposed on the first cylinder portion, engaged with the U-shape upper surface, and is larger in diameter than the first cylinder portion. The first cylinder portion is inserted deep into the U-shape-cut portion, and both sides of the U-shape opening of the U-shape-cut portion are extended from the plane of projection of the second cylinder portion.

9 Claims, 5 Drawing Sheets

SUSPENSION TYPE ROBOT WHOSE ROBOT BODY RUNS ALONG TRAVELING RAIL

CROSS REFERENCES TO RELATED APPLICATION

The present application relates to and incorporates by reference Japanese Patent application No. 2008-080775 filed on Mar. 26, 2008.

BACKGROUND OF THE INVENTION

1. Field of the Invention

The present invention relates to a suspension type robot, and in particular, to a suspension type robot that comprises a traveling rail mounted, in a bridge form, between apical ends of support armsupport arms of a pair of posts and a robot body suspended from the traveling rail so as to be able to move along the traveling rail.

2. Description of the Related Art

A suspension type robot is known as an assembly operation robot or the like in a factory, for example. Such a robot is disclosed, for example, in Japanese Unexamined Patent Publication No. 63-68382. This suspension type robot comprises a pair of posts positioned on a floor of a plant, a traveling rail mounted between the pair of posts in a bridge form, and a robot body (robot arm) supported by the traveling rail in a suspended form. The robot body moves back and forth along the traveling rail to perform operations.

The posts of the suspension type robot allow the traveling rail to be mounted in merely a single predetermined direction, so that the position of the post is determined according to the mounting position of the traveling rail. Thus, there was insufficient flexibility in locating the posts when, for example, a change to the layout of the facility was required.

The inventors of the present invention have conceived of a technical idea of displacing the position of the posts in relative to the traveling rail, by allowing an attachment portion of the traveling rail to be attachable to a support armsupport arm from predetermined directions. The support arm is provided to the apical end of each of the posts. However, moving the position of the post relative to the traveling rail causes the traveling rail to be temporarily unfixed from the posts, which could cause the traveling rail to fall down. Therefore, it is critical to provide a safe environment to operators when relocating the post.

SUMMARY OF THE INVENTION

The present invention has been invented in such a view, and it is therefore an object of the present invention to provide a suspension type robot, which allows the position of the posts to be displaced in relative to the traveling rail, and which allows the post to be safely relocated.

In order to achieve the aforementioned object, a suspension type robot according to the present invention comprises a pair of posts, a pair of support arms each supported by a respective one of the post, the support arms being disposed to extend in the same direction, each plate having an apical end, a traveling rail which is linear in shape and which is mounted between the apical ends of the support arms of the pair of posts in a bridge form, and a robot body mounted to the traveling rail in a suspended form and movable along the traveling rail. Each of the support arms has a U-shape-cut portion formed by partly cutting the apical end in a U shape, the U-shape-cut portion providing a U-shape opening and a U-shape upper surface surrounding the U-shape opening; and the traveling rail has an attachment portion comprising a first cylinder portion and a second cylinder portion, the first cylinder portion being inserted into the U-shape-cut portion from the U-shape opening thereof, the first cylinder portion fitting the U-shape-cut portion. The second cylinder portion is disposed on the first cylinder portion, the second cylinder portion being engaged with the U-shape upper surface, the second cylinder portion being larger in diameter than the first cylinder portion, the attachment portion being constructed to be fixed to the support arm in such manner that the first cylinder portion is inserted deep into the U-shape-cut portion, and both arms of the U-shape opening of the U-shape-cut portion being extended from the plane of projection of the second cylinder portion in a state where the attachment portion of the traveling rail is fixed to the support arm.

Accordingly, the attachment portion being fixed to the support arm of the post permits the traveling rail to be mounted so that it does not fall down. Since the attachment portion (the first cylinder portion) of the traveling rail has a circular form and it is fixed deeply inserted into the U-shape-cut portion, the support arm can support the attachment portion no matter which direction the U-shape opening of the U-shape-cut portion of the support arm is facing to, relative to the attachment portion of the traveling rail. Accordingly, the position of the post relative to the traveling rail can be displaced by rotating the post about the central axis of the first cylinder portion.

The position of the post can be displaced by rotating the support arm and the post while the first cylinder of the attachment portion is just inserted, in an unfixed manner, into the U-shape-cut portion of the support arm. However, in this condition, the attachment portion (the first cylinder portion) could slide from the backside to the U-shape opening side of the U-shape-cut portion, which could cause the attachment portion of the traveling rail to disengage from the support arm, resulting in the traveling rail falling down. While the first cylinder of the attachment portion is inserted deep into the U-shape-cut portion, both sides of the U-shape opening of the U-shape-cut portion at the apical end of the support arm are exposed from the second cylinder portion. However, when the first cylinder portion slides from the backside to the U-shape opening side of the U-shape-cut portion, the second cylinder portion hides the exposed portions.

Thus, while the operators are able to see the exposed portions that are at both sides of the U-shape opening of the U-shape-cut portion at the apical end of the support arm, it is possible to safely determine that the attachment portion of the traveling rail will not fall down from the support arm. On the other hand, when the operators are not able to see the exposed portions, it can be determined that the attachment portion could fall down from the support arm, and thus the operators can take sufficient actions to avoid any damage. Consequently, safeoperation is guaranteed in displacing the position of the post.

Further, in the present invention, a projection for slide prevention can be provided on the upper surface of the extended portion at the apical end of the support arm. The projection on the upper surface is positioned in such a manner that it is adjacent to the outer circumference of the second cylinder portion when the first cylinder portion is inserted deep into the U-shape-cut portion.

Accordingly, the projection for slide prevention can prevent the first cylinder portion from sliding from the backside to the U-shape opening side of the U-shape-cut portion at the time of displacing the position of the post with the attachment portion unfixed. This can further guarantee safeoperation in displacing the position of the post. Neither sides of the U-shape opening of the U-shape-cut portion at the apical end of the support arm contributes mechanical strength to the connected structure between the traveling rail and the post. Thus, the projection for slide prevention can be readily added without significant modifications or the like in the construction design.

Preferably, the attachment portion may be provided with a plurality of screw holes for bolts and the post is rotationally displaced by a ninety-degree pitch.

It is preferable that the plurality of screw holes can penetrate the U-shape upper surface.

It is also preferable that the support arms may be rotatably displaced about a central vertical axis of the attachment portion.

In order to achieve the object, as one aspect, the present invention provides a suspension type robot which comprises a pair of posts, a pair of support arms each supported by one of the posts, the support arms being disposed to extend in the same direction, each plate having an apical end, a traveling rail which is linear in shape and which is mounted between the apical ends of the support arms of the pair of posts in a bridge form, a robot body mounted to the traveling rail in a suspended form and movable along the traveling rail, means for allowing the traveling rail to be detachably mounted to the apical ends of the respective apical ends using engagement members to positionally secure the traveling rail to the support arms, means for preventing the traveling rail from dropping off from the support arms when the engagement members are removed, and means for showing that the traveling rail is mounted in position to the apical ends of the support arms in a state where the traveling rail has been mounted thereto.

DETAILED DESCRIPTION OF PREFERRED EMBODIMENTS

A detailed preferred embodiment of the present invention will be described below referring to FIGS. 1 to 4.

First, a full construction of a suspension type robot according to the embodiment will be described with reference to FIGS. 1 and 2. In the following description, the back and forth directions X as well as the left and right directions Y, and a height direction Z are determined as an XYZ orthogonal system based on the geometry shown in FIG. 2.

Briefly, the suspension type robot 1 comprises a pair of posts 2, 2 vertically upraising in the left and right sides on a placement table (or a floor) F in a factotry. The robot 1 further comprises a traveling rail 4 mounted between apical ends (front ends) of support arms 3, 3 provided at the upper end of the posts 2, 2. The traveling rail 4 is bridged between the support arms 3, 3, linearly extending in the left and right directions. The robot 1 further comprises a robot body 5 that is movable along the traveling rail 4, in a suspended form, along the traveling rail 4. In the following description, the apical side of the support arms 3, 3 in the back and forth direction X is referred to as a front side.

Figure 1:
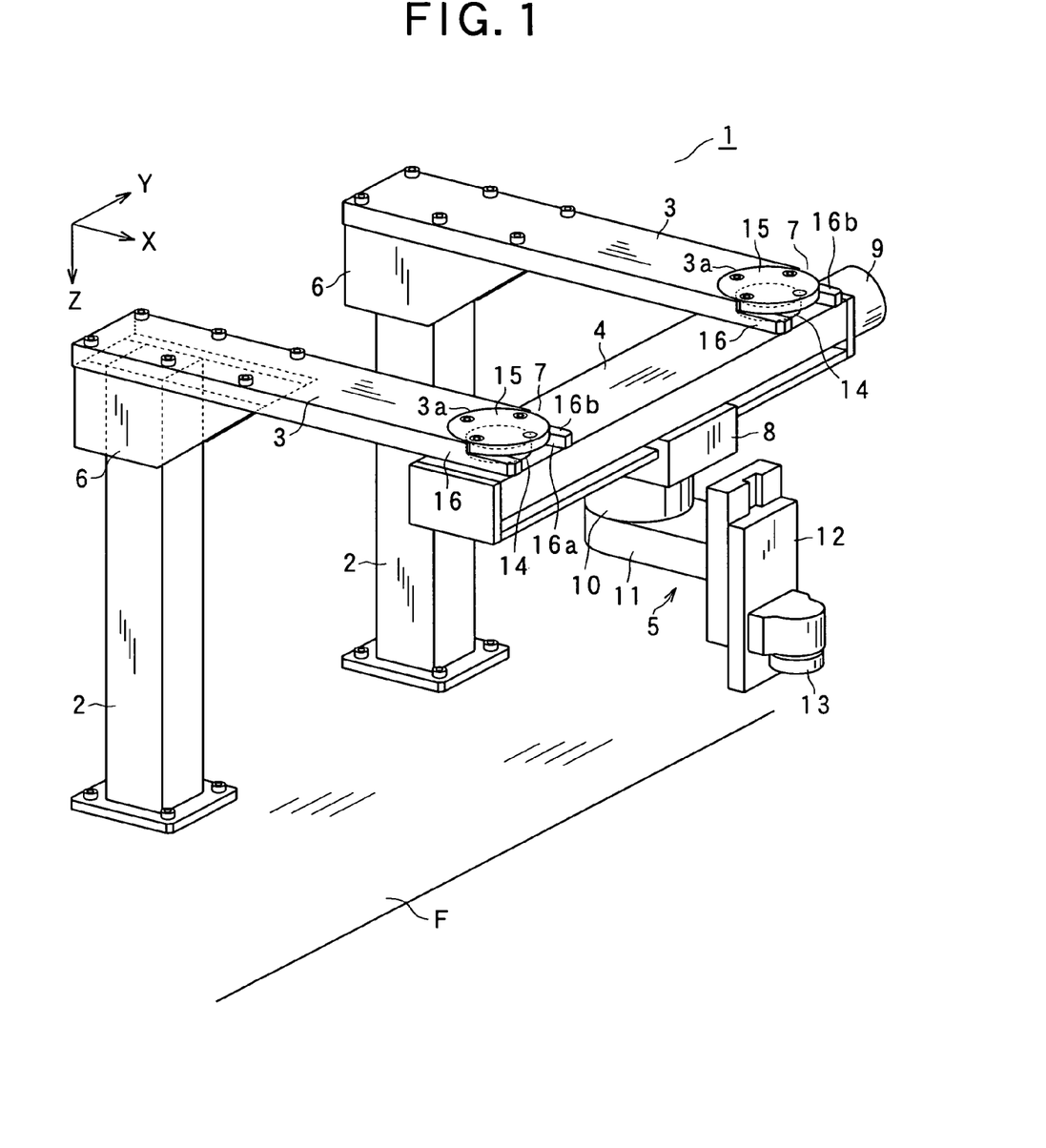
FIG. 1 is a perspective view showing the overall appearance of a suspension type of robot.

Each of the posts 2, 2 is formed, for example, in a longitudinal angular tube form in the up-down direction, and as shown in FIG. 1, a flange portion provided at the lower end of each post 2 is fixed to a placement table F with bolts. Each of the support arms 3 is fixed at the base portion thereof to the upper end of the post 2 with bolts. Each support arm 3 has a rectangle plate shape and horizontally extends in a direction approaching the front side (which is a frontward direction) FIGS. 1 and 2. A reinforcement plate 6 is provided at the upper left and right side surfaces of each post 2 to connect between the post 2 and the base portion of each support arm 3. An attachment portion 7 provided at the upper surface of the traveling rail 4 is mounted and fixed to the apical end of each support arms 3. This mounting structure will be described in detail later.

Figure 4:
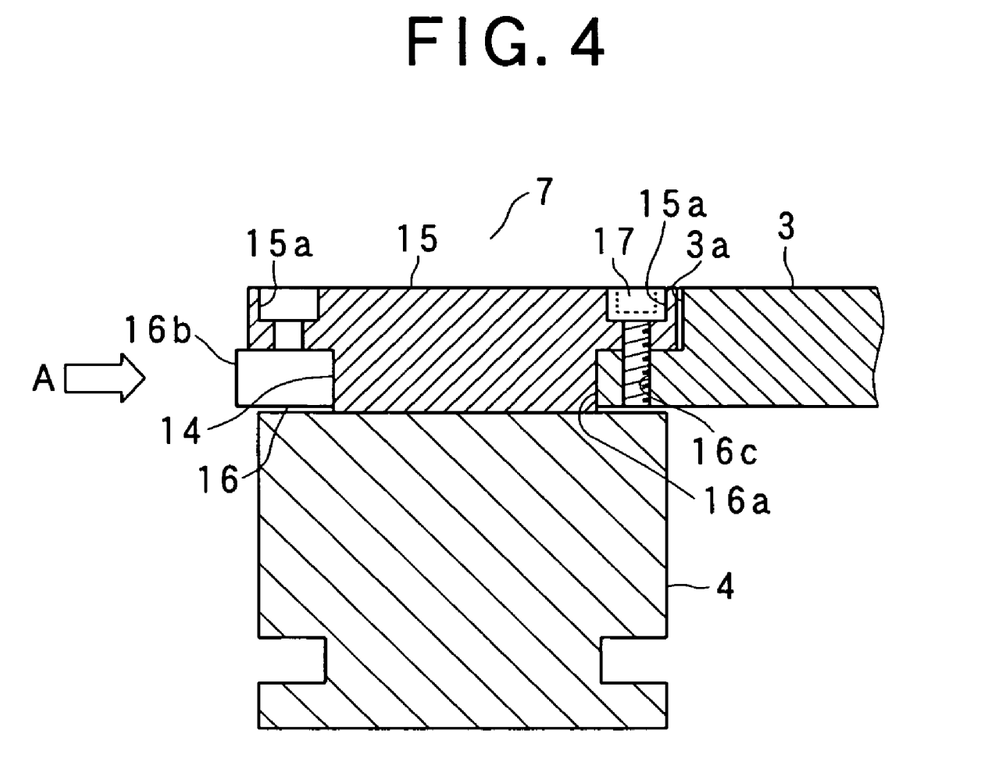
FIG. 4 is a vertical sectional side elevation view along the line II-II in FIG. 3A.

Also, as shown partially in FIG. 4, the traveling rail 4 has a horizontally long rectangle box shape in full construction, and as described above, it extends in the left and right directions between the apical ends (front ends) of the support arms 3, 3. As shown in FIG. 1, a movable body 8 is mounted to the traveling rail 4 capable of moving linearly along the traveling rail 4. A driving mechanism is also mounted to the traveling rail 4 to adequately move the movable body 8. Although detailed constructions are not shown in the drawings, the driving mechanism is constructed by a mechanism such as an electric motor 9 disposed at the right end of the traveling rail 4 (see FIG. 2) or a ball screw mechanism that is not shown.

As shown in FIG. 1, the robot body 5 comprises a base 10 connected to the under surface of the movable body 8. The robot body 5 also comprises an arm 11 that horizontally extends, and the base portion thereof is rotatably mounted to the under surface of the base 10 about a vertical axis perpendicular thereto, which is parallel to the height direction Z. The robot body 5 further comprises an elevation member 12 mounted to the apical end of the arm 11 capable of moving up and down in the height direction Z. The robot body 5 further comprises a wrist member 13 mounted to the lower surface side of the elevation member 12 capable of rotating about a vertical axis perpendicular thereto. The wrist member 13 is so constructed that hand tools such as a chuck can be attached to and removed from the member 13, which is not shown in the drawings.

Under such construction, the arm 11 horizontally rotates (swivels) by an electric motor and a rotation transmission mechanism included inside the base 10. The elevation member 12 moves up and down at the apical end of the arm 11 by an electric motor and a rack-and-pinion mechanism provided inside the arm 11. The wrist member 13 rotates by an electric motor provided to the elevation member 12. Those constructions are not shown in the drawings. A robot controller, which is not shown, controls the movement of the movable body 8 that moves along the traveling rail 4 (by the motor 9), the movement of the robot body 5 (by the respective electric motors assigned to the movements in the respective axes), and the movement of the hand tool. Accordingly, the suspension type robot 1 performs an assembly operation of, for example, automobile components.

Figure 3A:
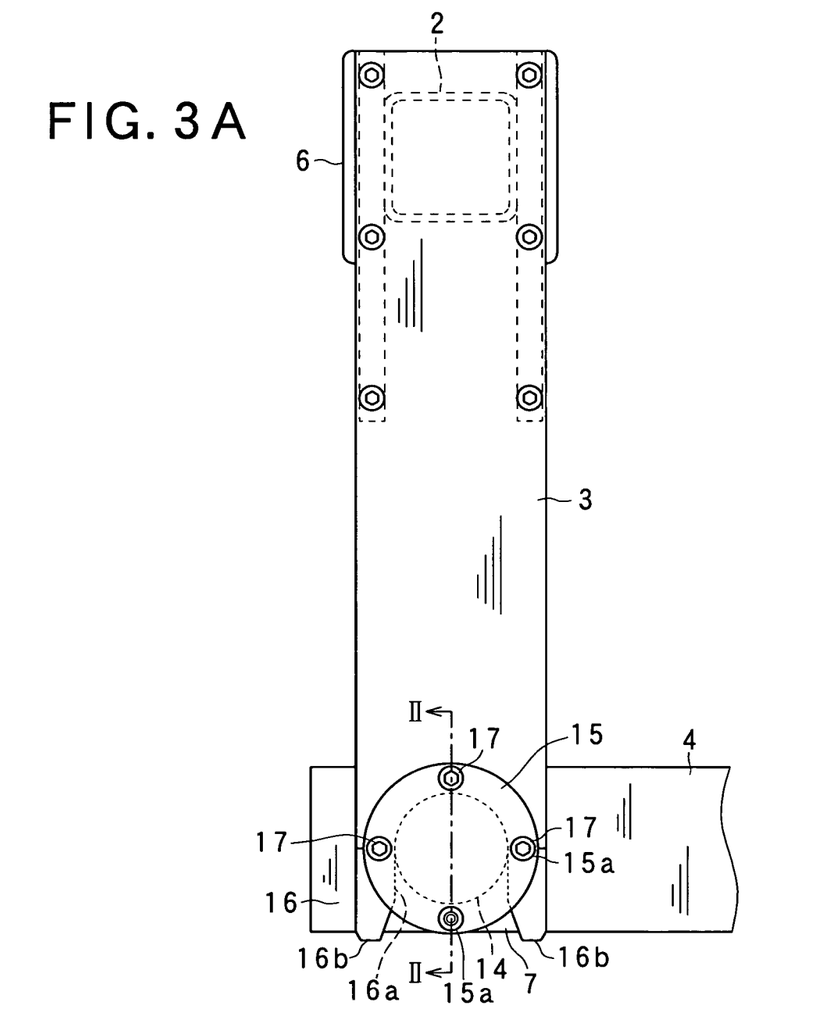
FIG. 3A is a plan view showing the apical end of a support arm to which a traveling rail is mounted, according to a preferred embodiment of the present invention.
Figure 3B:
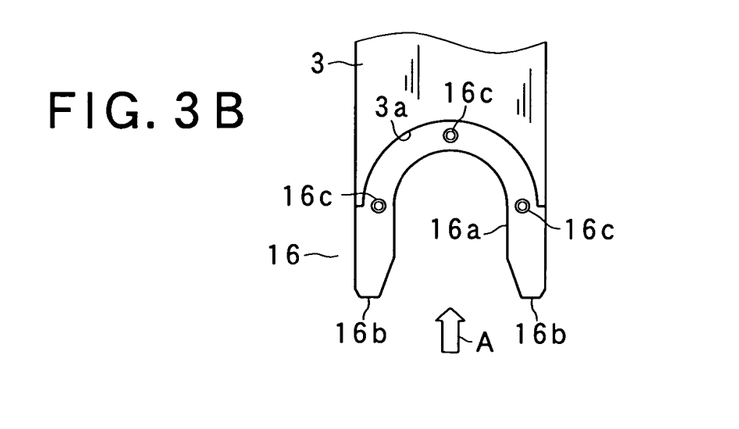
FIG. 3B is a plan view showing the apical end of the support arm to which the traveling rail is not mounted, according to the preferred embodiment of the present invention.

The mounting construction of the traveling rail 4 to the support arm 3 will be described hereinafter, referring to FIGS. 3A, 3B and 4. In this preferred embodiment, both ends of the traveling rail 4 are mounted to the apical ends of the left and right support arms 3, 3 with the use of the same mounting structures. The drawings shown in FIGS. 3A, 3B and 4 represent the mounting portion at the left side of the support arm 3 and the traveling rail 4.

Figure 2:
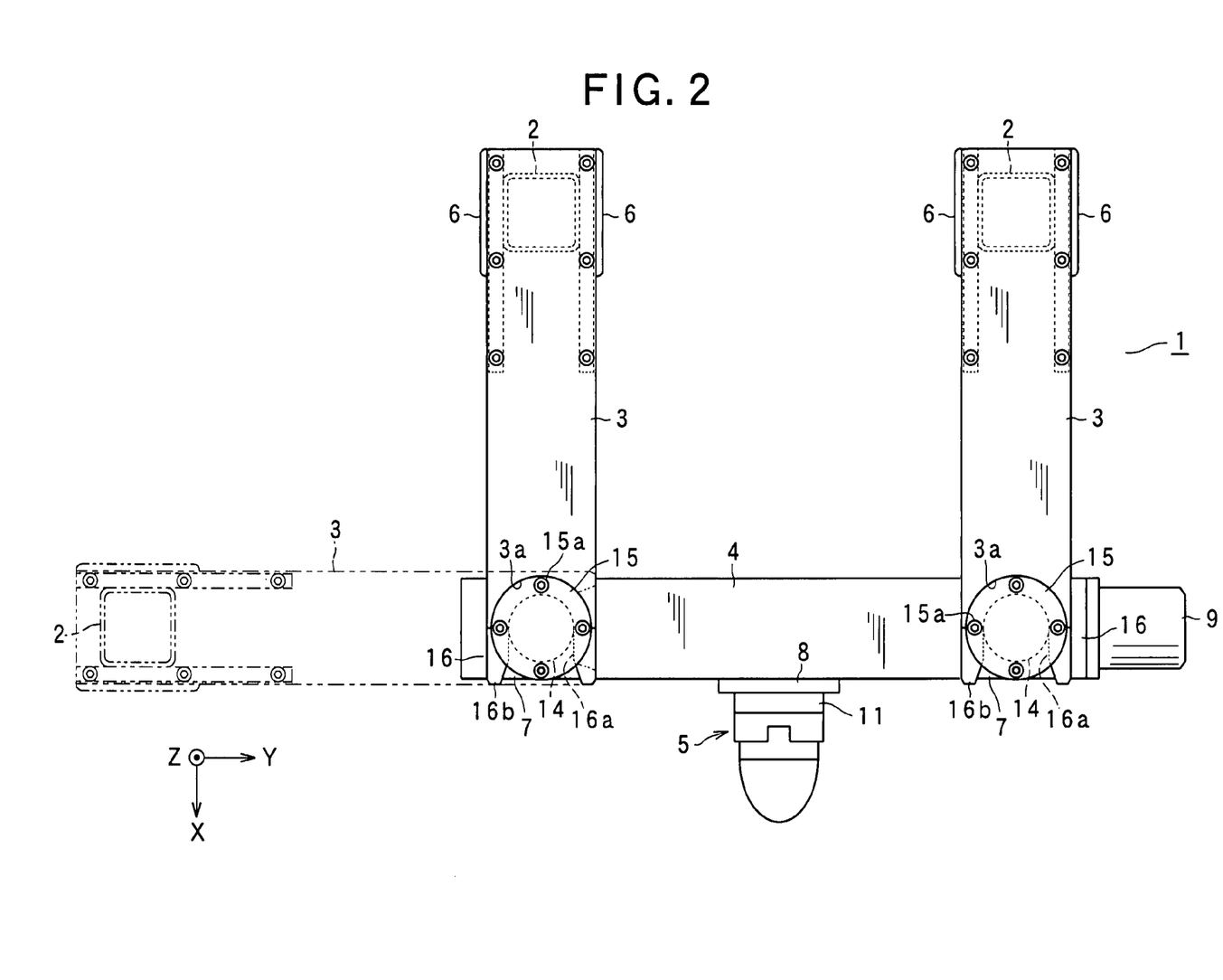
FIG. 2 is a plan view showing the suspension type robot.

The traveling rail 4 is provided with the attachment portions 7, 7 at the upper surface thereof, which are illustrated at the left and right sides of the drawing in FIG. 2. As shown in FIGS. 3A and 4, the attachment portion 7 consists of a first cylinder member 14 having a small diameter and fixed to the upper surface of the traveling rail 4, and a second cylinder member 15 having a large diameter and integrally and coaxially mounted to the upper surface of the first cylinder member 14. Both the first cylinder member 14 and the second cylinder member 15 have a thin circular disk shape, and the second cylinder member 15 has a diameter that is equal to or slightly larger than the width of the traveling rail 4. The first cylinder member 14 has a diameter that is slightly larger than half the diameter of the second cylinder member 15. The second cylinder member 15 has four stepped holes 15a at the periphery portion thereof for tightening bolts at, for example, a ninety-degree interval.

The support arm 3 has the following configuration at the apical end thereof. As shown in FIGS. 3B and 4, the support arm 3 is provided at the apical end thereof with a mounting portion 16 via a vertical wall (step portion) 3a, which mouth portion 16 is approximately half the thickness of the base portion side of the support arm 3. The vertical wall 3a, which is designated as a border between the thicker portion and the mounting portion 16 of the support arm 3, forms roughly such a semicircular arc, in the plan view, that runs along the outer circumference of the second cylinder member 15 of the attachment portion 7. The mounting portion 16 has a thickness that is slightly thinner than the thickness of the first cylinder member 14. The height (i.e., thickness) of the vertical wall 3a is roughly the same as the thickness of the second cylinder member 15.

The mounting portion 16 is provided with a U-shape-cut portion 16a that provides an opening at the apical end of the support arm 3. The first cylinder portion 14 of the mounting portion 7 fits to the U-shape-cut portion 16a by being horizontally inserted from the U-shape opening thereof to the direction indicated by the arrow "A" (in FIG. 3B). The width of the U-shape-cut portion 16a is slightly larger than the diameter of the first cylinder portion 14. The cut depth (the depth dimension) of the U-shape-cup portion 16a is arranged in such a manner that an exposed portion 16b is formed at both sides of the U-shape opening of the U-shape-cut portion, and that the exposed portion 16b has a certain length long enough to be exposed from the plane of projection (the disposed area) of the second cylinder portion 15, when the first cylinder portion 14 is inserted deep into the U-shape-cut portion 14.

The fit condition, where the first cylinder member 14 of the attachment portion 7 is inserted deep into the U-shape-cut portion 16a of the mounting portion 16 in the direction indicated by the arrow "A", permits the under surface of the second cylinder portion 15 to be mounted on the upper surface of the mounting portion 16 (the upper surface surrounding the U-shape-cut portion 16a), causing the second cylinder portion 15 to be engaged with the mounting portion 16 so that the traveling rail 4 does not fall down. In this condition, the back portion side of the outer circumference of the second cylinder portion 15 is positioned to contact the vertical wall 3a.

As shown in FIG. 3B, the mounting portion 16 is provided with three screw holes (holes for bolts) 16c at the upper portion thereof, which take place at the left, right and back sides of the U-shape-cut portion 16a. The screw holes 16c are provided at the positions corresponding to the stepped holes 15a of the second cylinder portion 15 of the attachment portion 7. That is, the screw holes 16c take place at the positions that overlap with three out of four stepped holes 15a, when the first cylinder portion 14 is inserted deep into the U-shape-cut portion 16a. The attachment portion 7 (the traveling rail 4) is to be fixed to the apical end (the mounting portion 16) of the support arm 3 by screwing three bolts 17 such as bolts with hexagon sockets into the screw holes 16c through the stepped holes 15a.

The positioning operation of the post 2 included in the above mentioned construction will be described. Suppose, as shown in FIGS. 1 and 2 (solid line), a pair of posts 2, 2 are positioned on the left and right sides of the placement table F with the support arms 3, 3 that extend in the forth direction. The traveling rail 4 is mounted to the pair of posts 2, 2 by lifting up the traveling rail 4 to cause each of the attachment portions 7, 7 at the upper surface of the traveling rail 4 to be positioned in front of the corresponding mounting portion 16 at the apical end of each support arm 3, followed by horizontally inserting simultaneously (in the direction indicated by the arrow "A") each of the first cylinder portions 14, 14 into the corresponding U-shape-cut portion 16a from the front side.

The insertion of the first cylinder portion 14 deep into the U-shape-cut portion 16a causes three stepped holes 15a of the second cylinder portion 15, which is placed on the upper surface of the mounting portion 16, to overlap with the corresponding screw holes 16c. Then, as shown in FIGS. 3A and 4, bolts 17 are screwed to tighten them. As shown in FIGS. 1 and 2, tightening the attachment portions 7, 7 at the left and right sides by the bolts 17 causes the traveling rail 4 to be fixed between the mounting portions 16, 16 of the support arms 3, 3, in a bridge form.

As shown in FIGS. 3A and 2, this fixed posture permits the exposed portions 16b, 16 to be exposed from the plane of projection (the area the second cylinder portion 15 is placed). The exposed portions 16b, 16b are located at both sides of the U-shape opening of the U-shape-cut portion 16. Further, the fixed posture causes the second cylinder portion 15 to contact at approximately half-way along the outer circumference of the vertical wall 3a, in such a manner that no gap is substantially formed between them. The fixed condition moreover causes the upper surface of the second cylinder portion 15 to be flush with the upper surface (behind the vertical wall 3a) of the support arm 3.

This preferred embodiment having the above mentioned construction allows the position of each of the posts 2, 2 (support arms 3, 3) to be rotatably displaced in a ninety-degree interval about the central vertical axis (the center of the first cylinder portion 14) of the attachment portion 7, in relative to the traveling rail 4. That is, the attachment portion 7 (the first cylinder portion 14) of the traveling rail 4 has a circular form, and it is inserted deep into the U-shape-cut portion 16a and fixed, which allows the attachment portion 7 to be supported by the mounting portion 16, no matter which direction the U-shape opening of the U-shape-cut portion 16a, which is the mounting portion 16 (the support arm 3), is facing to.

For example, as shown in FIG. 2 with the imaginary line, the ninety-degree counterclockwise rotation, in the plan view, of the post 2 at the left side (and the support arm 3) can displace the post 2 to the left side of the traveling rail 4 (at the position the support arm 3 extends in the left-and-right direction).

The displacement operation of the post 2 can be completed by the following process below. First, operators temporarily unfix the bottom portion of the post 2 from the installation table F, and also remove the bolts 17 to unfix the attachment portion 7 from the mounting portion 16.

This condition allows the support arm 3 and the post 2 to be displaced (with horizontal rotational movement) relative to the traveling rail 4, while the first cylinder portion 14 is inserted into the U-shape-cut portion 16a. Therefore, the operators can rotate the support arm 3 and the post 2 by ninety degrees, while keeping the traveling rail 4 (the mounting portion 7) immobile. Then, the post 2 is fixed (by bolts) at its bottom portion to the installation table F in the new position. Furthermore, in this stage, three stepped holes 15a of the second cylinder portion 15 overlap each with the corresponding three screw holes 16c of the mounting portion 16 that has also been rotated by ninety degrees, so that tightening the bolts 17 in this condition allows the traveling rail 4 to be fixed once again with the support arm 3.

During the displacement operation, the mounting portion 7 is temporarily unfixed from the attachment portion 16 of the support arm 3, causing the first cylinder portion 14 of the mounting portion 7 to be just loosely inserted into the U-shape-cut portion 16a. This condition can cause the mounting portion 7 (the first cylinder portion 14) to slide toward the U-shape opening side of the U-shape-cut portion 16a from its backside portion, which can eventually lead to disengagement of the mounting portion 16 from the second cylinder portion 15, letting the traveling rail 4 fall down.

However, in this preferred embodiment of the present invention, the exposed portions 16b, 16b of the mounting portion 16 are not hidden by the second cylinder portion 15 but are exposed, indicating the safety condition (the condition the mounting portion 7 will not slide) where the first cylinder portion 14 is inserted deep into the U-shape-cut portion 16a. On the other hand, when the mounting portion 7 slides from the backside portion to the U-shape opening side of the U-shape-cut portion 16a, the exposed portion 16b is hidden by the second cylinder portion 15. At the same time, when the first cylinder portion 14 is inserted deep into the U-shape-cut portion 16a, no substantial gap is provided between the second cylinder portion 15 and the vertical wall 3a. On the other hand, when the mounting portion 7 slides, a gap is formed between the second cylinder portion 15 and the vertical wall 3a.

Therefore, the visual recognition of the exposed portion 16 at the apical end of the support arm 3 by the operators indicates the safety condition that the mounting portion 7 will not fall from the attachment portion 7. On the other hand, the non-visible condition of the exposed portion 16b can sufficiently notify the operators that the mounting portion 7 could fall from the attachment portion 16, which allows the operators to take corresponding actions to avoid any damage. In this preferred embodiment, the operators can sufficiently determine if the attachment portion 7 could fall down from the mounting portion 16 by visually observing the gap between the outer circumference of the second cylinder portion 15 and the vertical wall 3a.

Accordingly, the operators can safely and sufficiently displace the position of the post 2 (the support arm 3) relative to the traveling rail 4, by carefully observing the exposed portion 16b (or the gap between the second cylinder portion 15 and the vertical wall 3a). The displacement operation can be performed for both the left and right posts 2, 2 (the support arms 3, 3) with various patterns.

The suspension type robot 1 according to the preferred embodiment of the invention allows the position of the post 2 (and the support arm 3) to be displaced relative to the position of the traveling rail 4. Thus, for example, this robot 1 can meet the need, for example, for displacing the position of the post 2 in relative to the position of the traveling rail 4 in accordance with the layout of a factory or the like. Further, this robot 1 can guarantee the safety to the operators when the attachment portion 7 is temporarily unfixed from the support arm 3 (the mounting portion 16) at the time the post 2 is displaced.

Figure 5A:
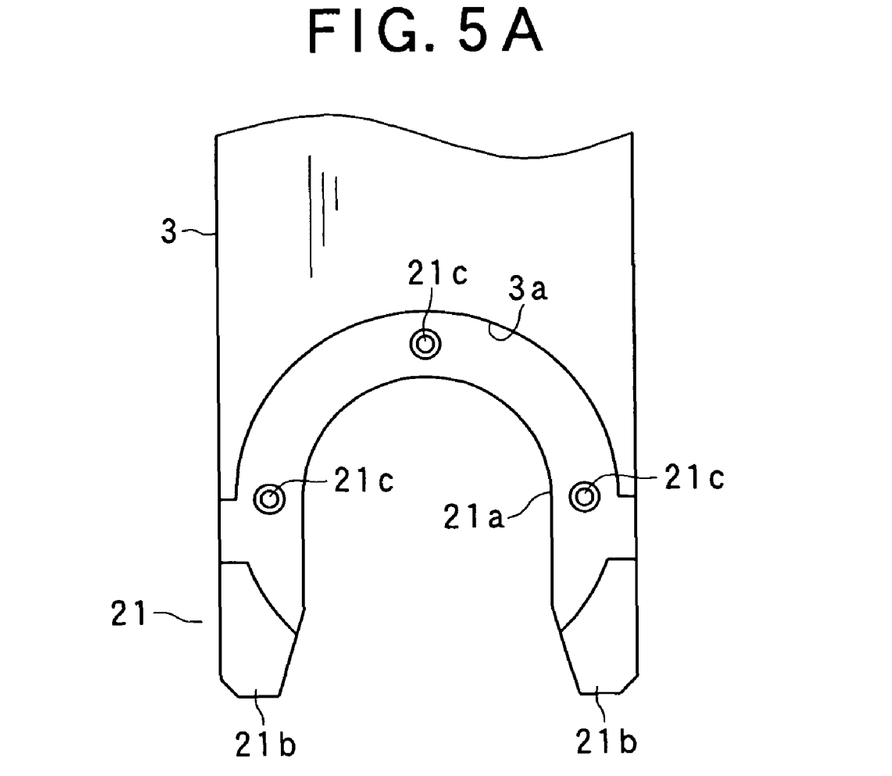
FIG. 5A is a plan view showing the apical end of the support arm according to another preferred embodiment of the invention.
Figure 5B:
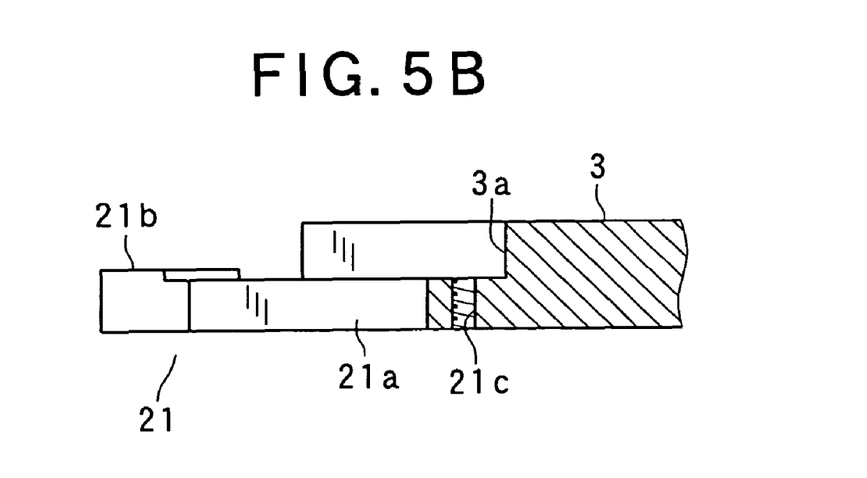
FIG. 5B is a vertical sectional side elevation showing the apical end of the support arm according to another preferred embodiment of the invention.

FIGS. 5A and 5B show another preferred embodiment of the present invention, in which the construction of the mounting portion 21 at the apical end of the support arm 3 is dissimilar to that of the previous embodiment. This embodiment also comprises the mounting portion 21 having the U-shape-cut portion 21a, and both sides of the U-shape opening of the U-shape-cut portion 21a are provided with the exposed portions 21b, 21b, each of which has a certain length and is exposed from the plane of projection (the are the fixed second cylinder portion 15 is disposed). The mounting portion 21 also has three screw holes 21c.

As shown in FIG. 5B, the exposed portions 21b, 21b in the mounting portion 21 is constructed such that they are slightly convexed toward the upper direction (in a step form with a thick portion toward the upward direction) relative to the area the second cylinder portion 15 is placed (which is the plane of projection). Accordingly, the entire upper portion of the exposed portions 21b, 21b in this embodiment is placed adjacent to the outer circumference of the second cylinder portion 15, and is designated as the projection for preventing the second cylinder portion 15 from sliding out, in the condition that the first cylinder portion 14 is inserted deep into the U-shape-cut portion 21a. The projection (the exposed portion 21b) consists of such a height that does not inhibit the first cylinder portion 14 from being inserted into the U-shape-cut portion 21a.

Accordingly, this construction can prevent the first cylinder portion 14 from sliding from the backside portion to the U-shape opening side of the U-shape-cut portion 21a, as the projections for slide prevention (the exposed portion 21b) engages with the outer circumference of the second cylinder portion 15 at the time of displacing the post 2 by unfixing the attachment portion 7. The exposed portions 21b, 21b in the mounting portion 21 at the apical end of the support arm 3 do not provide any mechanical strength to the connecting structure of the traveling rail 4 and the post 2, which allows the projections for slide prevention to be added without any difficulty and with no significant structural and design modifications.

Various modifications can be applied to the projection for slide prevention that is provided at the exposed portion 21b of the mounting portion 21. For example, a projection such as a pin can be fixed to the upper surface of the exposed portion 21. Further, the projection can be made of a pawl that is movable in the up-and-down direction and is pushed up by a spring force in an ordinal stage. The pawl is pushed down by the under surface of the second cylinder portion 15 at the time the first cylinder portion 14 is inserted into the U-shape-cut portion 16a. The pawl projects from the upper surface of the exposed portion 21b to take place adjacent to the outer circumference of the second cylinder portion 15, after the second cylinder portion 15 passes over the pawl.

The above mentioned preferred embodiment comprises the post 2 (the support arm 3) that is rotationally displaced by the ninety-degree pitch. A smaller pitch of the stepped holes 16*a* (with an increased number of the stepped holes 16*a*), for example, can increase the variation of the displacement of the post 2, instead of having four stepped holes 16*a* that are positioned by the ninety-degree interval. The modification can also be applied to the positions (pitch) and the number of the screw holes formed in the mounting portion 7.

While the present invention has been disclosed in terms of the preferred embodiment in order to facilitate better understanding thereof, it should be appreciated that the invention can be embodied in various ways without departing from the principle of the invention. For example, the support arm 3 can be constructed to have uniform thickness from one end to the other end, excluding the vertical wall 3*a*. In this construction, the second cylinder portion 15 is placed on the upper surface of the support arm 3. The various constructions can also be applied to the traveling rail 4, the robot body 5, and other members and components. The present invention again can be embodied in various ways without departing from the principle of the invention.

What is claimed is:

1. A suspension type robot, comprising:
   a pair of posts;
   a pair of support arms each supported by a respective one of the posts, the support arms being disposed to extend in a different direction from a direction in which the posts extend, each support arm having an apical end;
   a traveling rail which is mounted between the apical ends of the support arms of the pair of posts in a bridge form; and
   a robot body mounted to the traveling rail in a suspended form and movable along the traveling rail,
   wherein each of the support arms has a U-shape-cut portion formed by partly cutting the apical end in a U shape, the U-shape-cut portion providing a U-shape opening and a U-shape upper surface surrounding the U-shape opening; and
   the traveling rail has an attachment portion comprising a first cylinder portion and a second cylinder portion, the first cylinder portion being inserted into the U-shape-cut portion from the U-shape opening thereof, the first cylinder portion fitting the U-shape-cut portion, the second cylinder portion being disposed on the first cylinder portion, the second cylinder portion being engaged with the U-shape upper surface, the second cylinder portion being larger in a diameter than the first cylinder portion, the attachment portion being constructed to be fixed to the support arm in such manner that the first cylinder portion is inserted deep into the U-shape-cut portion, and both sides of the U-shape opening of the U-shape-cut portion are extended from a plane of projection of the second cylinder portion in a state where the attachment portion of the traveling rail is fixed to the support arm.

2. The suspension type robot according to claim 1, wherein an extended portion at the apical end of each of the support arms has a projection on the upper surface for preventing the traveling rail from sliding and dropping off at the upper surface thereof, and the projection is disposed adjacent to the outer circumference of the second cylinder portion when the first cylinder portion is inserted into the U-shape-cut portion so that the first cylinder portion reaches a deepest part of the U-shape-cut portion.

3. The suspension type robot according to claim 1, wherein the attachment portion has three holes for bolts and the post is rotationally displaced by ninety-degree pitches.

4. The suspension type robot according to claim 3, wherein the three holes for bolts penetrate both the U-shape cut portion and the second cylinder portion in an up-and-down direction of the robot so that the bolts are detachably inserted into the holes respectively to link the traveling rail and each of the support arms.

5. The suspension type robot according to claim 4, wherein the support arms are rotatively displaced about a central vertical axis of the attachment portion.

6. A suspension type robot, comprising:
   a pair of posts;
   a pair of support arms each supported by each of the posts, the support arms being disposed to extend in a different direction from a direction in which the posts extend, each support arm having an apical end;
   a traveling rail which is mounted between the apical ends of the support arms of the pair of posts in a bridge form;
   a robot body mounted to the traveling rail in a suspended form and movable along the traveling rail;
   first means for allowing the traveling rail to be detachably mounted to the apical ends of the respective apical ends using two sets of engagement members to positionally secure the traveling rail to the support arms, each of the sets of the engagement members being for each of the support arms;
   second means for preventing the traveling rail from dropping off from the support arms when the engagement members are removed; and
   third means for allowing at least one of the posts to be displaced a state where one of the sets of the engagement members for the post to be displaced is removed but the traveling rail is still mounted to the apical ends of the support arms supported by the posts.

7. The suspension type robot according to claim 6, wherein the third means allows the post and the support arm, which are paired, to rotate about a position where the traveling rail is mounted to the support arm.

8. The suspension type robot according to claim 6, wherein the robot is configured such that a user is able to confirm on the basis of an outside view of the robot whether or not the second means is functioning effectively while the post is being displaced.

9. The suspension type robot according to claim 8, wherein a position where the traveling rail is mounted to the support arm has a fitting structure as the second means,
   the robot is configured such that the user is able to confirm on the basis of the outside view of the robot whether or not the traveling rail is fitting to the support arm while the post is being displaced.

* * * * *